United States Patent Office 3,389,996
Patented June 25, 1968

3,389,996
TWO-COMPONENT HEAT DEVELOPABLE DIAZOTYPES
Walter J. Welch, Port Dickinson, N.Y., assignor to General Aniline & Film Corporation, New York, N.Y., a corporation of Delaware
No Drawing. Filed Oct. 15, 1964, Ser. No. 404,181
8 Claims. (Cl. 96—91)

ABSTRACT OF THE DISCLOSURE

Two-component diazotype photoprinting material susceptible to development on heating and a sensitizing composition for preparing same, which material comprises a support having thereon a light-sensitive layer comprising an azo coupling component, a light-sensitive diazonium compound, a neutral to acid salt of trichloroacetic acid and at least one polybasic acid alkali metal or ammonium salt stabilizer having at least one hydrogen atom bonded through oxygen to the polybasic carboxylic acid, the sensitizing composition comprising the components of the light-sensitive layer in an aqueous medium.

---

This invention relates to two-component diazotype photoprinting material susceptible to development on heating, wherein said light-sensitive two-component diazotype layer comprises a neutral to acid salt of trichloroacetic acid which yields an alkaline reacting compound on heating to a temperature between 100 and 200° C. and at least one polybasic acid salt stabilizer having at least one hydrogen atom bonded through oxygen to the polybasic acid and said salt group is selected from the group consisting of ammonium and alkali metals.

Two-component diazotype photoprinting material comprises a supporting sheet, such as paper or film, having in a surface coating or layer, an azo coupling component and a light-sensitive diazonium compound stabilized against premature coupling by inclusion of an acid stabilizer. On exposure of such coating to actinic light under an opaque pattern on a translucent background the light-sensitive diazonium compound is destroyed in the light-struck areas and on subsequent exposure to an alkaline development medium, such as gaseous ammonia, the acid stabilizer is neutralized and the residual diazonium compound couples with the coupling component to form an azo dye image in the areas corresponding to the opaque portions of the original pattern. Photoprinting materials of this type have met with various objections, such as the inconvenience associated with alkaline development and the need for special equipment to avoid obnoxious ammonia odors.

It has been proposed to include in a two-component light-sensitive diazotype layer of the aforesaid nature, one or more reagents having an acid to neutral reaction which, on heating, are converted or decomposed to yield an alkaline reacting compound. Diazotype photoprinting materials containing such reagents can be developed after exposure to light under a pattern as mentioned above by heating at a temperature causing the aforesaid modification or decomposition. The alkaline reaction product thereby formed neutralizes the acid stabilizer and causes image-wise coupling of the residual diazonium compound with the azo coupling component. Premature coupling of the diazonium compound during storage has tended to destroy the desired contrast in many cases.

Numerous attempts have been made in the prior art to obviate some of these problems. Thus, it has been proposed to prepare and apply the individual diazonium salts and coupling materials to photographic sheets in such a manner that they will form azo dyes under heat alone. An example is contained in U.S. Patent 2,418,623. This patent proposed to use a biguanidine salt and a diazo compound which would decompose under the influence of heat to yield ammonia as a developing agent.

A number of other prior art investigators have suggested that the diazonium salts and couplers might be developed by heat, provided they are applied in separate layers or coatings, the application of the separate coatings to be such as to avoid premature reaction between them. U.S. Patent 3,046,128 discloses a typical heat developing two-component diazotype of this type wherein a light-sensitive diazonium layer is applied to one side of a fairly porous sheet of paper and an alkali generating layer is applied to the opposite side of the paper. The alkali generating layer contains materials having a vapor pressure such that at room temperature or slightly above room temperature the alkaline material has a low vapor pressure and at temperatures of about 200 to 400° F. the alkali material has substantial vapor pressure. The alkaline material either breaks down and passes as a vapor through the paper or merely passes through the paper without any chemical breakdown. Various materials such as urea, guanidine, alkyl substituted ureas, ammonia salts of weak acid, volatile organic basic materials (ethylenediamine) are suggested. While this method has certain advantages it is relatively difficult to package more than one sheet of this material together without a reasonable chance of premature development of the diazotype layer. FIGURE 3 of this patent discloses the use of a vapor barrier film as a top coat for the diazo layer. This layer can obviate the aforesaid disadvantage. However this increases the cost of the final product unduly. Systems of this type also have the disadvantage that the coupling rate of the diazotype components is relatively slow because of the slow rate at which the alkaline material reaches the reaction zone.

It has also been suggested in some instances that the alkaline material be physically separated in some manner and only brought together later for development purposes. U.S. Patent 3,076,707 illustrates one method of accomplishing this. The patentees disclose forming a nonreactive crystalline complex of a basic material such as an amine, and a phenolic compound or urea. This crystalline complex is decomposed after exposure of the diazotype material by the influence of heat.

The use of alkaline generating agents, such as urea or trichloroacetic acid (sodium trichloroacetate in an acidic system, for coupling also has been proposed in the prior art. A reaction would take place subsequently on heating. However, urea decomposes below moderate storage temperature and even at normal room temperature. Furthermore, relatively large amounts of urea are required for satisfactory development. Note for example U.S. Patent 3,046,128 which suggests using up to 3,000 grs. of urea per one thousand square feet of diazotype paper. It is difficult to store materials of this type and maintain proper quantities over moderate periods of time. Sodium trichloroacetate tends to cause the diazonium salt to decompose prematurely thereby reducing dye density and brightness of image areas.

Each of these schemes however involves certain practical difficulties and none of them has been widely successful. Heating diazotype paper to 100 to 200° C. cannot be carried out without causing some degradation of the diazo compound. Density and brightness of the image obtained is accordingly dependent upon the coupling speed of the diazonium compound, the speed with which the alkaline material is made available to promote the coupling reaction and the rate at which the diazonium compound is decomposed. It is accordingly desirable to use fast coupling diazotype components and readily available sources of alakli. However the faster the coupling speed of the components, the poorer the shelf life of the diazotype. Correspondingly, the more readily available the alkaline source the more danger of premature coupling. Further, the neutral to acid salts of trichloroacetic acid, which are particularly advantageous readily available sources of alkali on heating, tend to cause premature decomposition of diazonium salts.

The object of this invention is to provide heat developing two-component diazotype materials having improved shelf life without significant reduction in dye development rate or dye density. More particularly the object of this invention is to provide heat developing two-component diazotype materials having these properties to a high degree wherein an alkaline source comprising a neutral to acid salt of trichloroacetic acid is contained in the two component diazotype layer.

I have now found that the objects of my invention can be accomplished by providing a heat developing two-component diazotype, wherein said light-sensitive two-component diazotype layer comprises a neutral to acid salt of trichloroacetic acid and at least one polybasic acid salt stabilizer having at least one hydrogen atom bonded through oxygen to the polybasic acid and said acid salt group is selected from the group consisting of ammonium and alkali metals. The polybasic acid salt stabilizer can be represented by the formula $(M)_m(H)_nR$ wherein R is the anion portion of a dibasic or tribasic acid, M is cation selected from the group consisting of ammonium and alkali metal, $m$ and $n$ are numbers from 1 to 2 and the sum of $m$ and $n$ is equal to the valence of the anion portion of the polybasic acid salt stabilizer. Suitable stabilizers include diammonium hydrogen citrate, ammonium dihydrogen citrate, potassium dihydrogen phosphate, disodium acid phosphate, sodium acid sulfate, potassium acid tartrate, sodium acid malonate, ammonium acid maleate, sodium acid phthalate, disodium acid 1,3,6-naphthalene trisulfonate, tetramethylammonium acid succinate, etc. These polybasic acid salts can be used in a concentration of about 0.1 to 5 parts by weight per part by weight of light-sensitive diazonium salt. Acid stabilizers such as citric acid, tartaric acid, boric acid, acetic acid, phosphoric acid and similar acid reacting compounds can be and preferably are used in conjunction with the polybasic acid salts.

The neutral to acid salts of trichloroacetic acid, which yield an alkaline reacting compound on heating to a temperature between 100 and 200° C., include the alkali metal (e.g. Na,K) and ammonium (tetramethylammonium, tetraethylammonium, etc.) salts of trichloroacetic acid.

The sensitizing compositions of this invention may contain as light-sensitive stable diazonium compounds, those listed in U.S. Patent 2,501,874 and in the article by Van der Grinten in Photographic Journal, vol. 92(B), p. 46. They are especially diazonium compounds derived from N-mono- or N-di-substituted p-phenylenediamines e.g. diazotization products of:

N,N-dimethyl-p-phenylenediamine
N,N-diethyl-p-phenylenediamine
N-benzyl-N-ethyl-p-phenylenediamine
N-ethyl-para-phenylenediamine
N,N-diethyl-2-ethoxy-p-phenylenediamine
N,N-bis-hydroxyethyl-p-phenylenediamine
N-ethyl-2-methyl-p-phenylenediamine
N-beta-hydroxyethyl-N-methyl-p-phenylenediamine
4-morpholinophenylamine These compounds are preferably stabilized in the form of their double salts with zinc chloride, tin chloride, cadmium chloride and the like.

Azo coupling components which can be incorporated in the materials of the invention are for example 2-(m-hydroxyphenoxy)ethanol
2,3-dihydroxynaphthalene
1,8-dihydroxynaphthalene
Phloroglucinol
Resorcinol
Octylresorcinol
Alpha-resorcylamid
3-methyl-1-phenyl-5-pyrazolone
Acetoacetanilide
H-acid
2,3-dihydroxynaphthalene-6-sulfonic acid
2,5-xylenol
2-methyl resorcinol In addition to the foregoing materials there can also be included reagents commonly employed in diazotype photoprinting materials, as for example, intensifiers such as ammonium sulfate, zinc chloride or nickel sulfate; stabilizing agents such as thiourea, or thiosinamine; accelerators such as 1-allyl-3-beta-hydroxyethyl-thiourea or 1-allyl-thiourea; hygroscopic agents such as glycol or glycerin; and wetting agents such as saponin, lauryl sulfate, keryl benzene sulfonate or oleyl-N-methyltaurine.

Moreover, there can be included, finely divided or colloidal silica or alumina, and/or aqueous dispersions of colloidal solutions of organic film-forming binders, such as colloidal water-soluble polyvinylalcohol, hydroxyethylcellulose, methylcellulose, gelatin or the like, or latex-like dispersions of polyvinyl chloride-acetate, polyvinylidene chloride, polyacrylonitrile of polymethylmethacrylate.

The components of the sensitizing composition are preferably incorporated in a single solution or suspension, and applied in a single coating step to the base. The latter may be paper, or film such as regenerated cellulose, cellulose acetate or other plastic films. However, the various components of the sensitizing composition can be applied, if desired, in successive coatings—one containing, for example, the diazonium salt, and another the alkali generating heat-sensitive reagent, the azo coupling component being incorporated in either of the two layers.

The material coated in accordance with the invention is developed after exposure under an opaque pattern on a translucent background, by heating at temperatures between 100 and 200° C., and preferably between 120 and 180° C., at which decomposition or conversion of the acid to neutral reagent to an alkaline reacting compound occurs. This promotes coupling of the residual diazonium compound with the azo coupling component in the areas corresponding to the opaque pattern to form an azo dye image.

The following examples are merely illustrative and should not be construed as limiting the scope of this invention. In the examples that follow, parts and percentages are by weight unless otherwise indicated.

Example 1

A paper base material was coated uniformly with the following sensitizing composition:

| | Parts by weight |
|---|---|
| Citric acid | 0.5 |
| Sodium 6,7-dihydroxynaphthalene-2-sulfonate | 2 |
| Sodium 1,3,6-naphthalene trisulfonate | 1 |
| Magnesium chloride | 1 |
| Acetamide | 5 |
| Sodium trichloroacetate | 4 |
| Diammonium citrate | 0.25 |
| Polyvinyl alcohol | 4 |
| 4-N,N - dimethylaminobenzenediazonium chlorozincate | 0.5 |
| Silica | 4 |
| Polyvinylacetate emulsion | 5 |
| Water | 100 |

The paper was dried and exposed to light under a translucent original containing opaque image areas. Development was obtained by passing the paper through a suitable heating chamber at temperatures up to 150° C. A blue dye of good density and brightness was formed in the image areas. Stability to premature coupling (i.e. shelf life) of this material was superior to paper coated with the same sensitizing solution containing no diammonium citrate. Essentially the same results can be obtained by replacing the diammonium citrate with sodium acid sulfate, disodium acid 1,3,6-naphthalene trisulfonate, ammonium acid maleate or sodium acid tartrate.

Example 2

Paper base material was coated uniformly with the following sensitizing composition:

| | Parts by weight |
|---|---|
| Citric acid | 0.5 |
| Sodium 6,7-dihydroxynaphthalene-2-sulfonate | 2 |
| Sodium 1,3,6-naphthalene trisulfonate | 1 |
| Magnesium chloride | 1 |
| Acetamide | 5 |
| Sodium trichloroacetate | 4 |
| Potassium dihydrogenphosphate | 0.5 |
| Polyvinyl alcohol | 4 |
| 4-N,N - dimethylaminobenzenediazonium chlorozincate | 0.5 |
| Silica | 4 |
| Polyvinylacetate emulsion | 5 |
| Water | 100 |

The paper was dried and exposed to light under a translucent original containing opaque image areas. Development was obtained by passing the paper through a suitable heating chamber at temperatures up to 150° C. A blue dye of good density and brightness was formed. Stability to premature coupling of this material was superior to paper coated with the same sensitizing solution containing no potassium dihydrogenphosphate.

Variations and modifications can be made in the procedures, compositions and materials herein described without departing from the scope or spirit of this invention.

I claim:

1. Two-component diazotype photoprinting material susceptible to development on heating, having on a surface of a support sheet, a light-sensitive layer comprising an azo coupling component, a light-sensitive diazonium compound, an acid stabilizer against premature coupling, a neutral to acid salt of trichloroacetic acid and at least one polybasic carboxylic acid salt stabilizer having at least one hydrogen atom bonded through oxygen to the polybasic acid and said polybasic carboxylic acid salt is selected from the group consisting of ammonium and alkali metal salts.

2. The article of claim 1 wherein said polybasic acid salt stabilizer is present in a concentration of about 0.1 to 5 parts by weight per part by weight of light-sensitive diazonium compound.

3. The article of claim 2 wherein said polybasic acid salt comprises a salt of citric acid.

4. The article of claim 1 wherein said acid stabilizer is selected from the group consisting of citric acid, tartaric acid, and acetic acid.

5. A sensitizing composition for two-component diazotype photoprinting materials susceptible to development on heating, comprising an aqueous medium, an azo coupling component, a light-sensitive diazonium compound, an acid stabilizer against premature coupling, a neutral to acid salt of trichloroacetic acid and at least one polybasic carboxylic acid salt stabilizer having at least one hydrogen atom bonded through oxygen to the polybasic acid and said polybasic carboxylic acid salt is selected from the group consisting of ammonium and alkali metal salts.

6. The composition of claim 5 wherein said polybasic acid salt stabilizer comprises from 0.1 to 5 parts by weight per part by weight of light-sensitive diazonium compound.

7. The composition of claim 6 wherein said polybasic acid salt comprises a salt of citric acid.

8. The composition of claim 6 wherein said composition comprises an additional acid stabilizer selected from the group consisting of citric acid, tartaric acid, and acetic acid.

References Cited

UNITED STATES PATENTS

| 1,770,352 | 7/1930 | Murray | 96—75 |
| 2,217,189 | 10/1940 | Sus | 96—91 X |
| 2,653,091 | 9/1953 | Greig | 96—75 X |
| 2,657,141 | 10/1953 | Kessels | 96—91 X |
| 2,773,768 | 12/1950 | Sanders et al. | 96—75 |
| 3,102,812 | 9/1963 | Welch | 96—75 |
| 3,123,472 | 3/1964 | Wilders et al. | 96—91 X |
| 3,202,510 | 8/1965 | Hollmann | 96—91 |
| 3,207,603 | 9/1965 | Savit | 96—75 |
| 3,298,834 | 1/1967 | Eldred et al. | 96—75 |
| 3,301,679 | 1/1967 | Halperin et al. | 96—75 |
| 3,316,092 | 4/1967 | Klimkowski et al. | 96—75 X |

FOREIGN PATENTS 875,307   8/1961   Great Britain.

NORMAN G. TORCHIN, *Primary Examiner.*

C. L. BOWERS, *Assistant Examiner.*